(12) United States Patent
Bassett et al.

(10) Patent No.: US 12,145,216 B2
(45) Date of Patent: Nov. 19, 2024

(54) SYSTEMS AND METHODS FOR LASER CLEAVING DIAMONDS

(71) Applicant: The Trustees of the University of Pennsylvania, Philadelphia, PA (US)

(72) Inventors: Lee Bassett, Wallingford, PA (US); Samuel Parks, Philadelphia, PA (US); Richard Grote, Los Angeles, CA (US); David Hopper, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 0 days.

(21) Appl. No.: 16/613,410

(22) PCT Filed: May 15, 2018

(86) PCT No.: PCT/US2018/032742
§ 371 (c)(1),
(2) Date: Nov. 13, 2019

(87) PCT Pub. No.: WO2018/213294
PCT Pub. Date: Nov. 22, 2018

(65) Prior Publication Data
US 2020/0164469 A1    May 28, 2020

Related U.S. Application Data

(60) Provisional application No. 62/506,396, filed on May 15, 2017.

(51) Int. Cl.
*B23K 26/53* (2014.01)
*B23K 26/082* (2014.01)
(Continued)

(52) U.S. Cl.
CPC ............ *B23K 26/53* (2015.10); *B23K 26/082* (2015.10); *B23K 26/402* (2013.01); *B23K 2103/50* (2018.08)

(58) Field of Classification Search
CPC .......... B23K 2103/50; B23K 26/0624; B23K 26/53; B23K 26/0006; B23K 26/0622;
(Continued)

(56) References Cited

U.S. PATENT DOCUMENTS 4,401,876 A * 8/1983 Cooper ................ B23K 26/032
219/121.68
4,546,231 A * 10/1985 Gresser ................. B28D 1/221
219/121.72
(Continued)

FOREIGN PATENT DOCUMENTS

EP        2868421 A1 *  5/2015  ......... B23K 26/0624
WO    WO 2016/059449 A1    4/2016

OTHER PUBLICATIONS http://web.archive.org/web/20160312062932/https://www.princeton.edu/~maelabs/mae324/glos324/silicon.htm (Year: 2016).*
(Continued)

*Primary Examiner* — Dana Ross
*Assistant Examiner* — Adam M Eckardt
(74) *Attorney, Agent, or Firm* — Jenkins, Taylor & Hunt, P.A.

(57) ABSTRACT

A laser is used to controllably generate and propagate cleaves to produce a cleaved surface along the {111} crystallographic plane in diamonds.

15 Claims, 8 Drawing Sheets

(51) Int. Cl.
*B23K 26/402* (2014.01)
*B23K 103/00* (2006.01)

(58) Field of Classification Search
CPC ............ B23K 2101/40; B23K 2103/52; B23K 26/0604; B23K 26/0619; B23K 26/40; B23K 26/402; B23K 2103/42; B23K 2103/54; B23K 2103/56; B23K 26/032; B23K 26/042; B23K 26/0608; B23K 26/0676; B23K 26/0738; B23K 26/08; B23K 26/082; B23K 26/083; B23K 26/361; B23K 26/362; B23K 26/364; B23K 26/38; B23K 26/382; B23K 26/00; B23K 26/06; B23K 101/40; B23K 103/00; B23K 26/03; B23K 26/04; B23K 26/035; B23K 26/064; B23K 26/50; C03B 33/0222; H01L 21/78; H01L 21/2633; H01L 33/0095; A44C 17/00; A44C 17/001; B23B 2226/315; B23B 2260/092; B23B 27/145; B23B 27/148; B26F 3/00; B28D 5/00; C03C 23/0025; C23C 16/01; C23C 16/0254; C23C 16/271; C23C 16/272; C23C 16/274; B23P 25/00

See application file for complete search history.

(56) References Cited

U.S. PATENT DOCUMENTS

| | | | | | |
|---|---|---|---|---|---|
| 4,560,853 | A * | 12/1985 | Ziegel | ................... | B23K 1/0056 219/121.64 |
| 5,012,067 | A * | 4/1991 | Sato | ...................... | B28D 1/221 219/121.72 |
| 5,178,645 | A * | 1/1993 | Nakamura | ............. | C23C 16/271 51/293 |
| 5,410,125 | A * | 4/1995 | Winston | ............... | B23K 26/066 219/121.73 |
| 6,248,649 | B1 * | 6/2001 | Henley | ............. | H01L 21/67092 438/526 |
| 7,052,978 | B2 * | 5/2006 | Shaheen | ................ | B23K 26/40 438/460 |
| 10,074,565 | B2 * | 9/2018 | Vanagas | ............. | B23K 26/0006 |
| 10,286,487 | B2 * | 5/2019 | Kancharla | .......... | B23K 26/0665 |
| 10,611,667 | B2 * | 4/2020 | Bookbinder | ........ | C03B 33/0222 |
| 10,710,922 | B2 * | 7/2020 | O'Connor | .......... | B23K 26/402 |
| 10,843,297 | B2 * | 11/2020 | Baer | ..................... | B23K 26/067 |
| 2003/0121897 | A1 * | 7/2003 | Patton | ..................... | B44F 1/10 219/121.69 |
| 2004/0089642 | A1 * | 5/2004 | Christensen | ............ | B44B 7/007 219/121.69 |
| 2005/0105871 | A1 * | 5/2005 | Staupendahl | ........ | B23K 26/082 385/134 |
| 2007/0051706 | A1 * | 3/2007 | Bovatsek | ............... | B23K 26/40 219/121.64 |
| 2008/0172856 | A1 * | 7/2008 | Brouckaert | ............ | B29C 33/38 29/557 |
| 2009/0159580 | A1 * | 6/2009 | Hsu | ...................... | B23K 26/146 219/121.68 |
| 2011/0132885 | A1 * | 6/2011 | Sercel | .................... | B23K 26/40 219/121.72 |
| 2012/0077296 | A1 * | 3/2012 | Yamada | ............... | B23K 26/032 438/33 |
| 2012/0211477 | A1 * | 8/2012 | Chacin | ................ | B23K 26/035 219/121.68 |
| 2013/0032582 | A1 | 2/2013 | Henley | | |
| 2013/0126573 | A1 * | 5/2013 | Hosseini | ............ | B23K 26/0006 225/2 |
| 2013/0288489 | A1 * | 10/2013 | Hoff | ..................... | B23K 26/382 438/798 |
| 2014/0038392 | A1 * | 2/2014 | Yonehara | ............ | H01L 33/0093 438/463 |
| 2014/0312017 | A1 * | 10/2014 | Potemkin | ........... | B23K 26/0006 219/121.76 |
| 2015/0038313 | A1 * | 2/2015 | Hosseini | ............ | B23K 26/0648 219/121.75 |
| 2015/0118522 | A1 * | 4/2015 | Hosseini | ............. | C03B 33/0222 428/64.2 |
| 2015/0121960 | A1 * | 5/2015 | Hosseini | ................ | A44C 17/00 65/29.11 |
| 2015/0224594 | A1 * | 8/2015 | Wort | .................. | B23K 15/0006 219/121.18 |
| 2016/0170040 | A1 * | 6/2016 | Kim | ...................... | G01T 1/2002 250/366 |
| 2016/0199944 | A1 * | 7/2016 | Hosseini | ............. | B23K 26/361 216/60 |
| 2016/0250714 | A1 * | 9/2016 | Zhang | ................ | B23K 26/0608 219/121.61 |
| 2016/0311060 | A1 * | 10/2016 | Lu | ......................... | B23K 26/364 |
| 2019/0001442 | A1 * | 1/2019 | Unrath | ................. | B23K 26/082 |
| 2020/0164469 | A1 * | 5/2020 | Bassett | ................ | B23K 26/0622 |
| 2020/0324368 | A1 * | 10/2020 | Hosseini | ................ | B23K 26/53 |
| 2021/0162540 | A1 * | 6/2021 | Houbertz | ............ | G03F 7/70416 |
| 2021/0276125 | A1 * | 9/2021 | Lu | ......................... | B23K 26/082 |
| 2021/0316401 | A1 * | 10/2021 | Ionin | ..................... | G01N 21/65 |

OTHER PUBLICATIONS

International Search Report and Written Opinion of the International Search Authority for International Application Serial No. PCT/US18/32742 (dated Aug. 1, 2018).

K. Ohno, F.J. Heremans, L.C. Bassett, B.A. Myers, D.M. Toyli, A.C.B. Jayich, C.J. Palmstrøm, D.D. Awschalom, Engineering shallow spins in diamond with nitrogen delta-doping, Appl. Phys. Lett. 101 (8) (2012) 082413, http://dx_doi.org/10. 1063/1.4748280.

B.J. Hausmann, I. Bulu, P. Deotare, M. Mccutcheon, V. Venkataraman, M. Markham, D. Twitchen, M. Lonar, Integrated high-quality factor optical resonators in diamond, Nano Lett. 13 (5) (2013) 1898-1902, http://dx.doi.org/10.1021/n/3037454.

R. Casquel, M. Holgado, J. García-Ballesteros, K. Zinoviev, C. Fernandez-Sánchez, F. Sanza, C. Molpeceres, M. Laguna, A. Llobera, J. Ocaña, et al., UV laser-induced high resolution cleaving of Si wafers for micro-nano devices and polymeric waveguide characterization, Appl. Surf. Sci. 257 (12) (2011) 5424-5428, http://dx.doi.org/10.1016/j.apsusc.2010.11.021.

E. Ohmura, M. Kumagai, M. Nakano, K. Kuno, K. Fukumitsu, H. Morita, Analysis of processing mechanism in stealth dicing of ultra thin silicon wafer, J. Adv. Mech. Des. Syst. Manuf. 2 (4) (2008) 540-549, http://dx.doi.org/10.1299/jamdsm 2.540.

R.H. Telling. C.J. Pickard, M.C. Payne, J.E. Field, Theoretical strength and cleavage of diamond, Phys. Rev. Lett. 84 (2000) 5160-5163, http://dx.doi.org/10.1103/PhysRevLett.84.5160.

T. Kononenko, V. Konov, S. Pimenov, N. Rossukanyi, A. Rukovishnikov, V. Romano, Three-dimensional laser writing in diamond bulk Diamond Relat. Mater. 20 (2) (2011) 264-268, http://dx.doi.org/10.1016/j.diamond.2010.12.013.

A. Rabinovitch, V. Frid, D. Bahat, Wallner lines revisited, J. Appl. Phys 99 (2006) 076102, http://dx.doi.org/10.1063/1.2181692.

V.I. Konov, Laser in micro and nanoprocessing of diamond materials, Laser & Photonics Reviews 6 (6) (2012) 739-766, http://dx.doi.org/10.1002/lpor.201100030.

M. Kumagai, N. Uchiyama, E. Ohmura, R. Sugiura, K. Atsumi, K. Fukumitsu, Advanced dicing technology for semiconductor wafer-stealth dicing, IEEE Trans. Semicond. Manuf. 20 (3) (2007) 259-265, http://dx.doi.org/10.1109/TSM. 2007.901849.

S. Stoupin, S. Antipov, J.E. Butler, A.V. Kolyadin, A. Katrusha, Large-surface-area diamond (111) crystal plates for applications in high-heat-load wavefront-preserving x-ray crystal optics, J. Synchrotron Radiat. 23 (5) (2016) 1118-1123, http://dx.doi.org/10.1107/S1600577516011796.

I. Friel, S. Clewes, H. Dhillon, N. Perkins, D. Twitchen, G. Scarsbrook, Control of surface and bulk crystalline quality in single crystal diamond grown by chemical vapour deposition, Diamond Relat. Mater. 18 (5-8) (2009) 808-815, http://dx.doi.org/10.1016/j.diamond.2009.01.013 proceedings of Diamond 2008, the 19th Euro-

(56) References Cited

OTHER PUBLICATIONS pean Conference on Diamond, Diamond-like Materials, Carbon Nanotubes, Nitrides and Silicon Carbide.

L.M. Pham, N. Bar-Gill, D.L.e. Sage, C. Belthangady, A. Stacey, M. Markham, D.J. Twitchen, M.D. Lukin, R.L. Walsworth, Enhanced metrology using preferential orientation of nitrogen-vacancy centers in diamond, Phys. Rev. B 86 (2012) 121202. http:/dx.doi.org/10.1103/PhysRevB.86.121202.

H. Bernien, B. Hensen, W. Pfaff, G. Koolstra, M.S. Blok, L. Robledo, T.H. Taminiau, M. Markham, D.J. Twitchen, L. Childress, R. Hanson, Heralded entanglement between solid-state qubits separated by three metres, Nature 497 (7447) (2013) 86-90, http://dx.doi.org/10.1038/nature 12016.

E. Neu, P. Appel, M. Ganzhorn, J. Miguel-Sánchez, M. Lesik, V. Mille, V. Jacques, A. Tallaire, J. Achard, P. Maletinsky, Photonic nano-structures on (111)- oriented diamond, Appl. Phys. Lett. 104 (15) (2014) 153108, http://dx.doi.org/10.1063/1.4871580.

M.K. Bhaskar, D.D. Sukachev, A. Sipahigil, R.E. Evans, M.J. Burek, C.T. Nguyen, L.J. Rogers, P. Siyushev, M.H. Metsch, H. Park, F. Jelezko, M. Lonar, M.D. Lukin, Quantum nonlinear optics with a germanium-vacancy color center in nanoscale diamond waveguide, Phys. Rev. Lett. 118 (2017) 223603, http://dx.doi.org/10.1103/PhysRevLett.118.223603.

C. Hepp, T. Müller, V. Waselowski, J.N. Becker, B. Pingault, H. Sternschulte, D. Steinmüller-Nethl, A. Gali, J.R. Maze, M. Atatüre, C. Becher, Electronic structure of the silicon vacancy color center in diamond, Phys. Rev. Lett. 112 (2014) 036405. http://dx.doi.org/10.1103/PhysRevLett 112.036405.

D.D. Awschalom, L.C. Bassett, A.S. Dzurak, E.L. Hu, J.R. Petta, Quantum spintronics: engineering and manipulating atom-like spins in semiconductors, Science 339 (6124) (2013) 1174-1179, http://dx.doi.org/10.1126/science.1231364.

H. Kato, S. Yamasaki, H. Okushi, N-type doping of (001)-oriented single-crystalline diamond by phosphorus, Appl. Phys. Lett. 86 (22) (2005) 222111, http://dx.doi.org/10.1063/1.1944228.

M. Katagiri, J. Isoya, S. Koizumi, H. Kanda, Lightly phosphorus-doped homoepitaxial diamond films grown by chemical vapor deposition, Appl. Phys. Lett. 85 (26) (2004) 6365-6367, http://dx.doi.org/10.1063/1.1840119.

A. Sabella, J.A. Piper, R.P. Mildren, 1240 nm diamond Raman laser operating near the quantum limit, Opt. Lett. 35 (23) (2010) 3874-3876, http://dx.doi.org/10.1364/OL.35.003874.

J. Field, The mechanical and strength properties of diamond, Rep. Prog. Phys. 75 (12) (2012) 126505, http://dx.doi.org/10.1088/0034-4885/75/U.S. Appl. No. 12/126,505.

E.M. Wilks, J. Wilks, The resistance of diamond to abrasion, J. Phys. D Appl. Phys. 5 (10) (1972) 1902, http://dx.doi.org/10.1088/0022-3727/5/10/323.

F. Gao, Z. Huang, B. Felgel, J.V.a.n. Erps, H. Thienpont, R.G. Beausoleil, N. Vermeulen, Low-loss millimeter- length waveguides and grating couplers in single crystal diamond, J. Lightwave Technol. 34 (23) (2016) 5576- 5582. http://dx.doi.org/10.1109/JLT.2016.2622620.

R.R. Grote, L.C. Bassett, Single-mode optical waveguides on native high-refractive index substrates, APL Photonics 1 (7) (2016) 071302, http://dx.doi.org/10.1063/1.4955065.

T. Schröder, S.L. Mouradian, J. Zheng, M.E. Trusheim, M. Walsh, E.H. Chen, L. Li, I. Bayn, D. Englund, Quantum nanophotonics in diamond [invited], Josa B 33 (4) (2016) B65-B83, http://dx.doi.org/10.1364/JOSAB.33.000865.

L. Rondin, J. Tetienne, T. Hingant, J. Roch, P. Maletinsky, V. Jacques, Magnetometry with nitrogen-vacancy defects in diamond, Rep. Prog. Phys. 77 (5) (2014) 056503, http://dx.doi.org/10.1088/0034-4885/77/5/056503.

R.J. Narayan, R.D. Boehm, A.V. Sumant, Medical applications of diamond particles & surfaces, Mater. Today 14 (4) (2011) 154-163, http://dx.doi.org/10.1016/S1369-7021(11)70087-6.

G. Balasubramanian, A. Lazariev, S.R. Arumugam, D .- W. Duan, Nitrogen-vacancy color center in diamond- emerging nanoscale applications in bioimaging and biosensing, Curr. Opin. Chem. Biol. 20 (2014) 69-77, http://dx.doi.org/10.1016/j.cbpa.2014.04.014.

P. Latawiec, V. Venkataraman, M.J. Burek, B.J. Hausmann, I. Bulu, M. Lonar, On-chip diamond raman laser, Optica 2 (11) (2015) 924-928, http://dx.doi.org/10.1364/OPTICA.2.000924.

B. Hausmann, I. Bulu, V. Venkataraman, P. Deotare, M. Lonar, Diamond nonlinear photonics, Nature Photon 8 (5) (2014) 369-374, http://dx.doi.org/10.1038/nphoton.2014.72.

R.P. Mildren, J.E. Butler, J.R. Rabeau, CVD-diamond external cavity Raman laser at 573 nm, Opt. Express 16 (23) (2008) 18950-18955, http://dx.doi.org/10.1364/OE.16.018950.

A. Balducci, M. Marinelli, E. Milani, M. Morgada, A. Tucciarone, G. Verona-Rinati, M. Angelone, M. Pillon, Extreme ultraviolet single-crystal diamond detectors by chemical vapor deposition, Appl. Phys. Lett. 86 (19) (2005) 193509. http://dx.doi.org/10.1063/1.1927709.

J. Achard, F. Silva, R. Issaoui, O. Brinza, A. Tallaire, H. Schneider, K. Isoird, H. Ding, S. Koné, M. Pinault, et al., Thick boron doped diamond single crystals for high power electronics, Diamond Relat. Mater. 20 (2) (2011) 145-152, http://dx.doi.org/10.1016/i.diamond.2010.11.014.

J. Gracio, Q. Fan, J. Madaleno, Diamond growth by chemical vapour deposition, J. Phys. D Appl. Phys. 43 (37) (2010) 374017, http://dx.doi.org/10.1088/00223727/43/U.S. Appl. No. 37/374,017.

R.S. Balmer, J.R. Brandon, S.L. Clewes, H.K. Dhillon, J.M. Dodson, I. Friel, P.N. Inglis, T.D. Madgwick, M.L. Markham, T.P. Mollart, N. Perkins, G.A. Scarsbrook, D.J. Twitchen, A.J. Whitehead, J.J. Willman, S.M. Woollard, Chemical vapour deposition synthetic diamond: materials, technology and applications, J. Phys .: Condens. Matter 21 (36) (2009) 364221, http://dx.dol.org/10.1088/0953-8984/21/36/364,221.

\* cited by examiner

SYSTEMS AND METHODS FOR LASER CLEAVING DIAMONDS

CROSS-REFERENCE TO RELATED APPLICATION

This application claims priority to U.S. Application No. 62/506,396, filed May 15, 2017, the entire disclosure of which is incorporated herein by reference for all purposes.

FEDERALLY SPONSORED RESEARCH STATEMENT

This invention was made with government support under contract number EECS-1553511 awarded by the National Science Foundation. The government has certain rights in this invention.

FIELD OF THE INVENTION

The invention is related to cleaving diamonds and more particularly to systems and methods for laser cleaving diamonds.

BACKGROUND OF THE INVENTION

Diamond has become an increasingly attractive material for a variety of applications because of its wide bandgap, high carrier mobility, and high index of refraction. Because of diamond's naturally high thermal conductivity, corrosion resistance, and biocompatibility, the collection of diamond-based platforms has grown rapidly over the last decade, extending to high-power electronics, radiation-hard detectors, optoelectronic switches, and a variety of photonic platforms. Critical to many of these applications are substrates with {111} crystal faces, such as when doping diamond for use in high-power electronics and alignment to point-defects commonly used for quantum applications. However, the standard chemical vapor deposition (CVD) single-crystal growth procedure for producing diamond substrates cannot grow large {111}-oriented plates. Due to twinning and stacking faults that form along {111} directions, epitaxial growth of {111}-oriented layers while maintaining low surface roughness is limited to ~100 nm films. Without the ability to grow single-crystal {111}-diamond efficiently, labor-intensive and stress-inducing fabrication methods are needed to produce {111} faces large enough and smooth enough for use in any of the above mentioned applications.

Macroscopic (111)-faced plates are typically cut from larger (100)-faced starting plates using micro-machining laser ablation tools and subsequent polishing steps are used to reduce the surface roughness. This process results in substantial loss of costly single-crystal diamond material (kerf loss) along with misalignment of the resulting face relative to [111], since it is nearly impossible to polish the (111) face using traditional methods. Furthermore, the mechanical polishing step induces sub-surface damage that can only be removed by further chemical etching.

Ablating diamond via high-power lasers has been achieved using a variety of wavelengths which rely on a combination of graphitization and ablation, but these lasers have not been used as tools for controlled crack generation in diamond. Pulsed visible lasers have been previously shown to graphitize and ablate diamond using doubled solid-state lasers with very short pulse durations ranging from 7 ns at 539 nm down to 230 fs at 515 nm. The expectation for a laser of this type was for ablation and graphitization to dominate the morphological changes to the diamond substrate.

In summary the availability of high-purity synthetic diamond crystals oriented with pristine {111} faces is needed for emerging applications in high-power electronics and quantum technology. However, existing approaches to generating these samples include arduous growth and polishing steps that waste material and introduce unwanted crystal damage. Direct growth along the {111} directions produces surfaces with micron-scale roughness that must be polished before use. An alternative approach is to "rough cut" {111}-oriented crystals from a larger {100}-oriented sample using laser ablation, again followed by polishing to achieve a smooth surface. Although it is possible to mechanically cleave diamond along {111} directions, this process requires the introduction of a nucleation site, or kerf, followed by the positioning and controlled impulse of a knife. This approach requires significant technical skill and is not is not capable of positioning cleave planes with micron-scale precision from millimeter-scale samples.

SUMMARY OF THE INVENTION

Aspects of the invention relate to systems and methods for using a laser to controllably generate and propagate cleaves along the {111} crystallographic plane in diamonds.

According to one aspect, a method is provided for forming a cleaved surface of a diamond. The method includes forming an initial cleave line in the diamond by laterally scanning, in a first direction, a laser beam extending through the diamond from a front surface of the diamond to a back surface of the diamond. The method further includes forming a plurality of additional cleave lines in the diamond by incrementally repositioning the laser beam in a second direction along a cleaving surface and laterally scanning, in the first direction, the laser beam at each incremental position. The initial cleave line and the plurality of additional cleave lines produced by the method define the cleaved surface of the diamond.

In accordance with another aspect, a laser system is provided for nucleated cleaving of a diamond. The system includes a laser beam generator configured to produce a laser beam for nucleated cleaving and a processor configured to control the laser beam generator. The processor is configured to form an initial cleave line in the diamond by laterally scanning the diamond in a first direction with the laser beam, the laser beam extending through the diamond from a front surface of the diamond to a back surface of the diamond, the initial cleave line originating at the textured region. The processor is further configured to form a plurality of additional cleave lines in the diamond by incrementally repositioning the laser beam in a second direction along a desired cleaving surface and laterally scanning the diamond in the first direction with the laser beam at each incremental position. The initial cleave line and the plurality of additional cleave lines formed using the laser defining the cleaved surface of the diamond.

DESCRIPTION OF THE FIGURES

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Laser cleaving technique in accordance with embodiments of the present invention are able to generate atomically-flat {111} surfaces from standard {100} synthetic crystals without the need for any polishing steps. These surface areas may be over 100 times larger than current standard fabrication methods are capable of producing while allowing for specific cleave planes from the {111} family to be controllably selected and positioned with micron-scale accuracy to generate plates with thickness selectable to below 200 μm. These technique may be useful in the development of high-power electronics, quantum information architectures, and ultrasensitive magnetometers by reducing the process time and improving the quality of industry standard {111} diamond fabrication.

Figure 1:
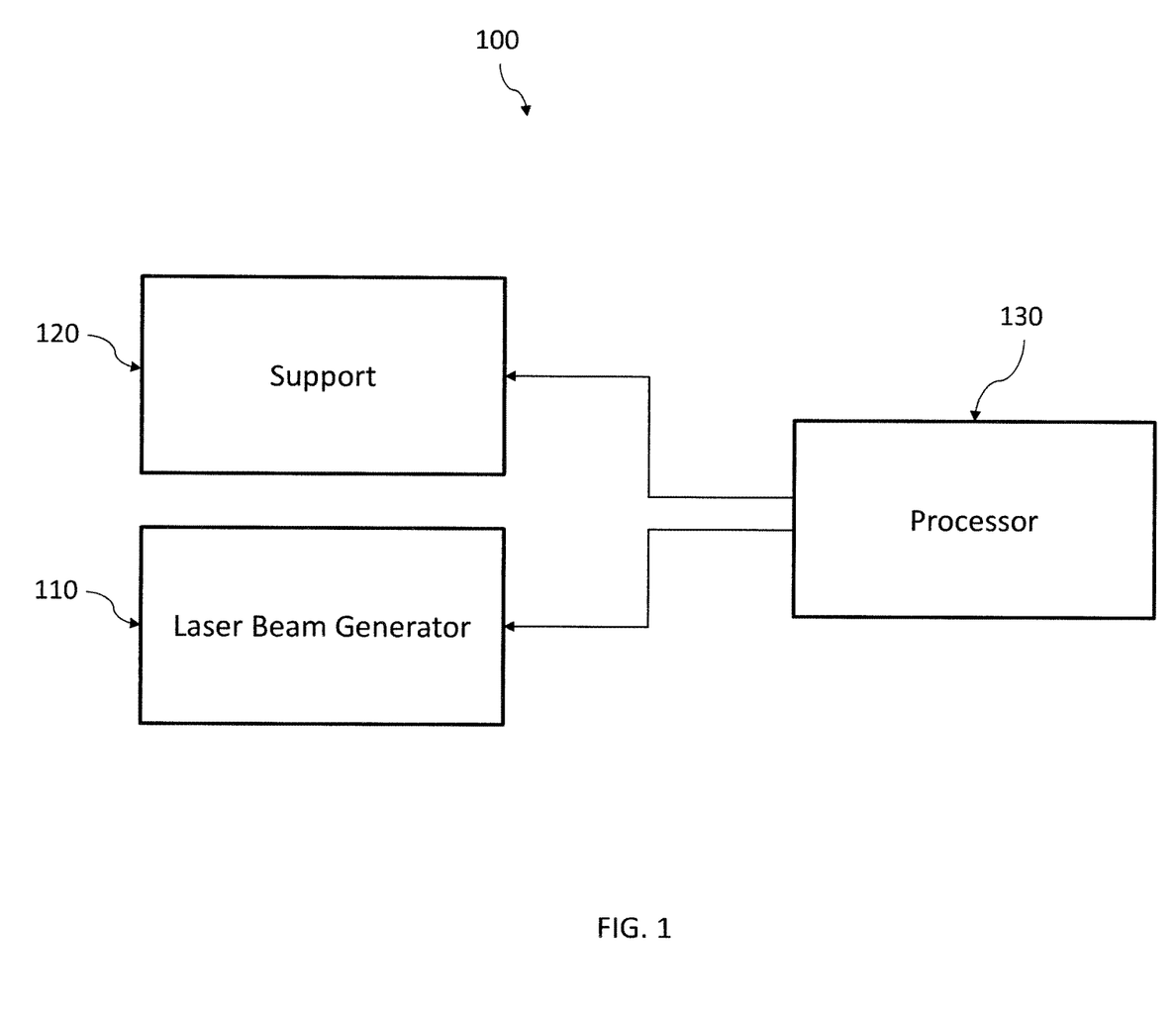
FIG. 1 is a schematic of a system for cleaving a diamond in accordance with the aspects of the invention.

FIG. 1 illustrates a schematic of a system 100 for cleaving a diamond 210 in accordance with the aspects of the invention. System 100 includes a laser beam generator 110 configured to produce a laser beam 112 for nucleated cleaving. Suitable laser beam generators would be known to one of ordinary skill in the art based on the disclosure provided herein. System 100 also includes a processor 130 configured to control the laser beam generator 110 and/or a support 120. Support 120 may be any suitable device or system configured to support and/or position the laser beam generator 120. The processor 120 is configured to control the laser beam generator 110 and the support 120 to produce a cleaved surface by forming an initial cleave line 220 and a plurality of additional cleave lines 222 in the diamond 210 according to the methods disclosed herein. Suitable processors for controlling the laser beam generator 110 and support 120 to achieve the methods disclosed herein would be known to one of ordinary skill in the art.

Figure 2A:
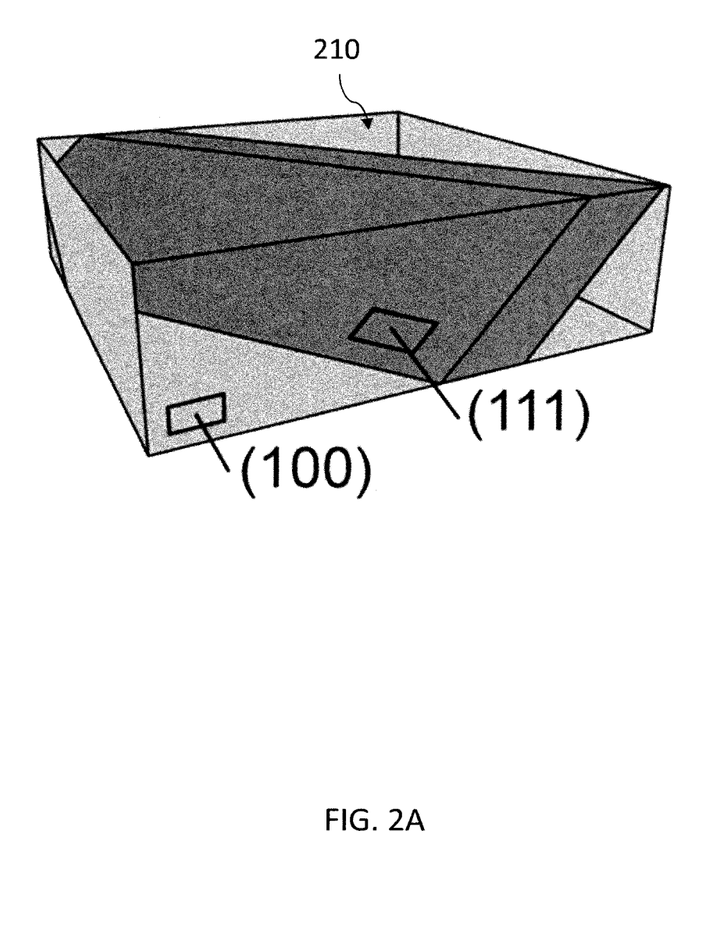
FIG. 2A is an illustration of the orientation of a {111} plate that can be produced from an LP {100}-faced sample with {100} sides in accordance with aspects of the invention.

A cleaving method in accordance with aspects of the invention is now described. Cleaving is performed on a diamond 210 such as a commercially available type IIa CVD single-crystal diamond with both high and low nitrogen and boron impurity levels [low purity (LP) and high purity (HP), respectively]. Specifications for the starting sample diamond 210 are given in Table 1 below with their orientations illustrated in FIGS. 1A and 1B. FIG. 2A illustrates the orientation of a {111} plate 212 that can be produced from an LP {100}-faced sample diamond 210 with {100} sides and FIG. 2B illustrates the orientation of a {111} plate 212 that can be produced from a high-purity (HP) sample diamond 210 with {110} sides.

TABLE 1

Figure 2B:
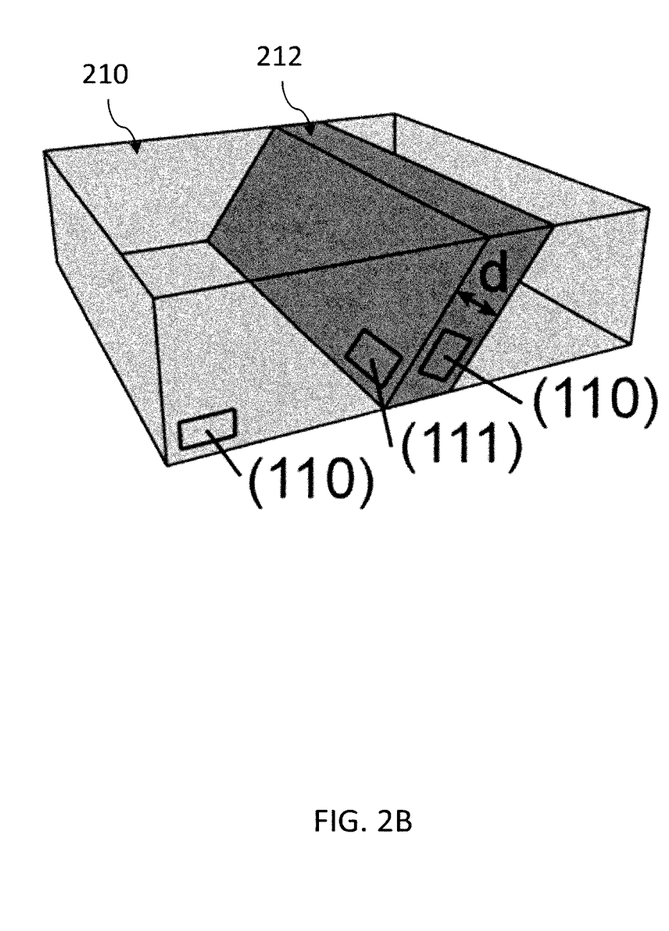
FIG. 2B is an illustration of the orientation of a {111} plate that can be produced from a high-purity (HP) sample with {110} sides in accordance with aspects of the invention.

|  | High-Purity (HP) | Low-Purity (LP) |
|---|---|---|
| Nitrogen Content | <5 ppb | <1 ppm |
| Boron Content | <1 ppb | <0.05 ppm |
| Lateral Dims. | 2.0 mm × 2.0 mm | 3.0 mm × 3.0 mm & 2.6 mm × 2.6 mm |
| Thickness | 0.5 mm | 0.3 mm |
| Edge orientation | {110} FIG. 2B | {100} FIG. 2A |
| Part no. | 145-500-0385 | 145-500-0253 & 145-500-0275-01 |

Cleaving is performed using a laser beam 112 such as a nanosecond pulsed, frequency-doubled Yb-doped fiber operating at a wavelength of 532 nm, integrated in a micromachining laser system (IPG Photonics, IX-280-ML). The laser parameters used in this implementation for cleaving are provided in Table 2 below. Diamond samples (e.g., diamond sample 210) were mounted on a 1 mm-thick glass microscope slide with double-sided tape on a porous vacuum chuck for stability.

TABLE 2

| Wavelength | 532 nm |
| Pulse Energy | 200 μJ |
| Repetition rate | 150 kHz |
| Pulse length | 2 ns |
| Spot size | <17 μm |
| Translation Speed | 8 cm/sec |

Figure 3A:
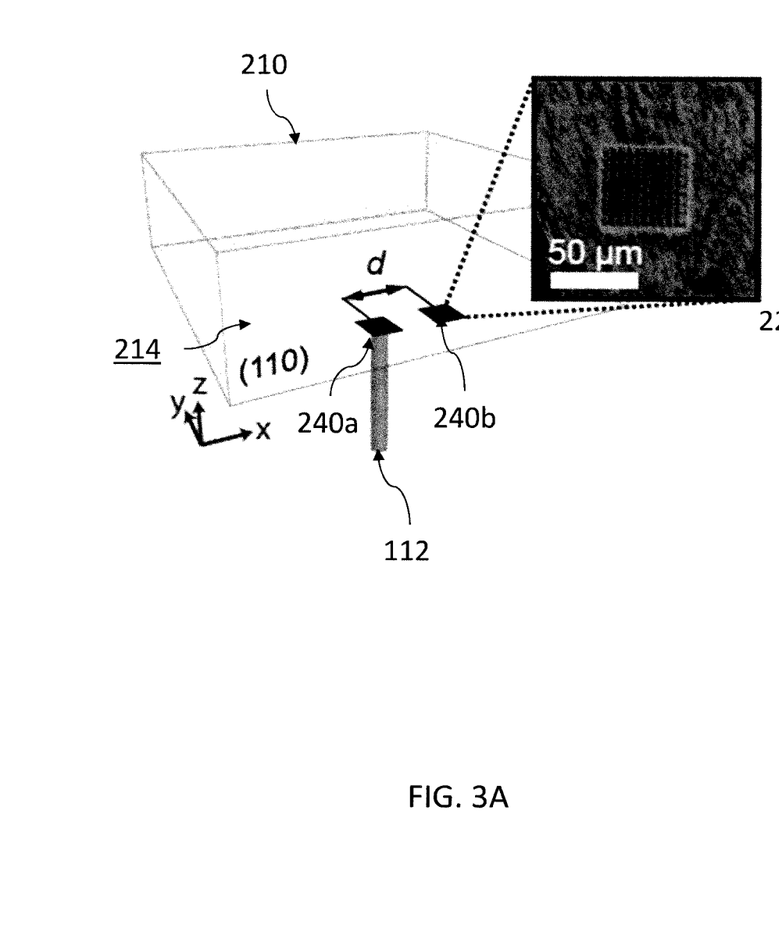
FIG. 3A is a top-down illustration of a nucleation site generation using a laser cleaving process for HP diamond with {100} top and bottom faces and {110} side walls in accordance with aspects of the invention (the black region refers to the textured nucleation site performed with the UV Excimer laser)

The cleave method begins with fabricating a textured regions 240a and 240b seen in FIG. 3A on the backside of the sample diamond 210 that provides the nucleation site 224 for the initial crack to form. The nucleation site 224 is created using a laser such as a UV Excimer laser micromaching system (198 nm, IPG Photonics IX-255) with a 10 µm square mask. Columns of 8 individual, evenly spaced, 2 µs pulses performed over a 50 µm vertical translation were horizontally separated by 5 µm for a total of 10 columns, resulting in a 50 µm×50 µm textured area. The fabrication of nucleation sites 224 may be used for generating the first initial crack of each cleave line 220 and not for the continued crack propagation process (FIGS. 2C-2D). The geometric parameters of this cleave process, h, c, L, w, and d, found in FIGS. 2A-3F, establish limiting dimensions of {111} plates 212 that can be produced, as well as guide the cleaving process in avoidance of unwanted cracking. Geometric parameter c is the full cleave-line raster length, which is not shown in the figures. The absolute parameters, i.e., the parameters set by the starting dimensions of the diamond plate 210 to be cleaved, are h-sample thickness, and c-cleave line (laser raster) length. These parameters are related by c=h/tan 55°. L was chosen in an attempt to minimize the amount of ablation damage to the {111} face after cleaving but also ensure that cleave propagation (FIG. 3C) occurred with as few unwanted cracks as possible. A value of L=300 µm was used, however, an L of different sizes may be used. The relative distance between nucleation sites 224, w, is established by the desired thickness d (FIG. 3F) as well as the limitations that demand $w_{min}$>c, where w=d/sin(55°), in order to avoid unwanted cracking, and $w_{max}$<(c+h)tan(55°) in order to achieve two overlapping {111} faces in the final plate 212. Therefore, $d_{min}$ of the fabricated plate 212 is given by $d_{min}$=h sin(35°). The minimum thickness ensures that the laser beam 112 does not intersect with an existing exposed {111} face causing unwanted cracking. The maximum value for d before the projected area of the top and bottom {111} faces no longer intersect (transmission through one {111} face and out of the back f111g face is no longer possible) is given by $d_{max}$=h/sin(35°).

After the nucleation sites 224 are fabricated, the sample diamond 210 is cleaned, e.g., for 20 min in a barrel asher at 150 W and 20 sccm of $O_2$ to remove the resulting graphite. After cleaning, the sample diamond 210 is remounted, e.g., with the nucleation sites 224 downward (away from the laser objective) in the λ=532 laser. The unpolished side of as-received single-side polished LP sample with a surface roughness of Ra=250 nm is a sufficient nucleation site 224.

The cleaving process may begin with the 532 nm laser laterally aimed through the sample diamond 210 at the nucleation site on the backside. The focusing optics of the laser have a focal length, a beam waist of <17 µm, a laser beam 112 quality factor of M2=1.5, and a depth of field equal to 800 µm. The laser is then focused on the top surface of the diamond substrate, and the Z-axis of the sample stage is translated 375 µm closer to the beam objective. This shift in focus allows for an energy density (fluence) differential between the top {100} surface and the backside/back surface 214 of the sample diamond 210 with the nucleation site(s) 224. The fluence differential prevents graphitization and ablation from occurring on the top {100} surface where the laser beam 112 is defocused but allows for the threshold of graphitization and ablation at the sample backside to occur.

Figure 3B:
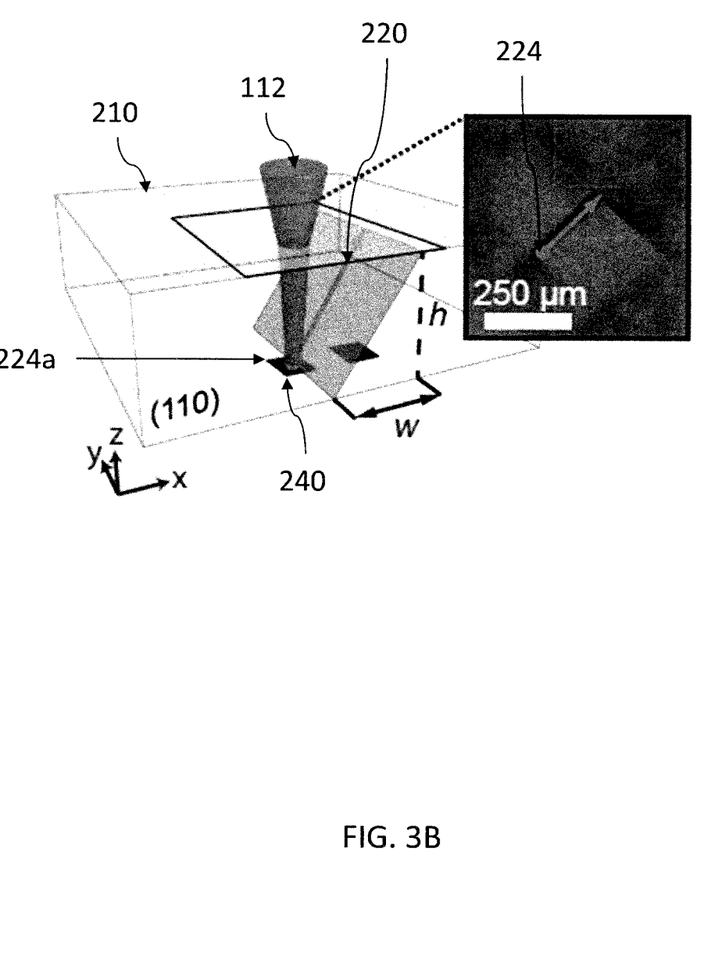
FIGS. 3B and 3C are top-down illustrations of cleave lines (laser rasters) cut horizontally to produce a {111} face tilted in the direction of laser translation in accordance with aspects of the invention.

Once focus is set, an initial cleave line 220 is performed by translating the laser beam 112 by c, e.g., in a lateral direction (coplanar with the top {100} surface) perpendicular to the propagation direction of a {111} crystallographic plane to stimulate an initial crack (FIG. 3B, one-direction arrow). This initial crack is seen in the inset in FIG. 3B is the slightly lighter region extending outward from the blackened laser cleave line. Propagating this initial crack outwards in both direction with subsequent additional cleave lines 222 seen in FIGS. 2C-2D generates the complete cleave surface 230 spanning the sample diamond 210.

Figure 3C:
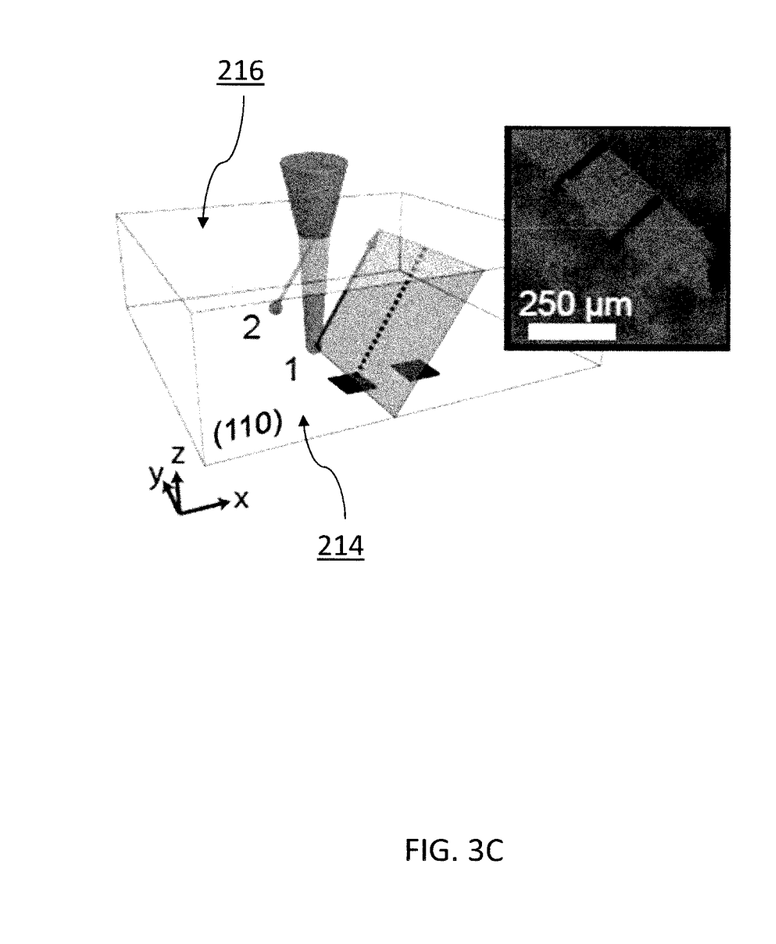
Figure 3D:
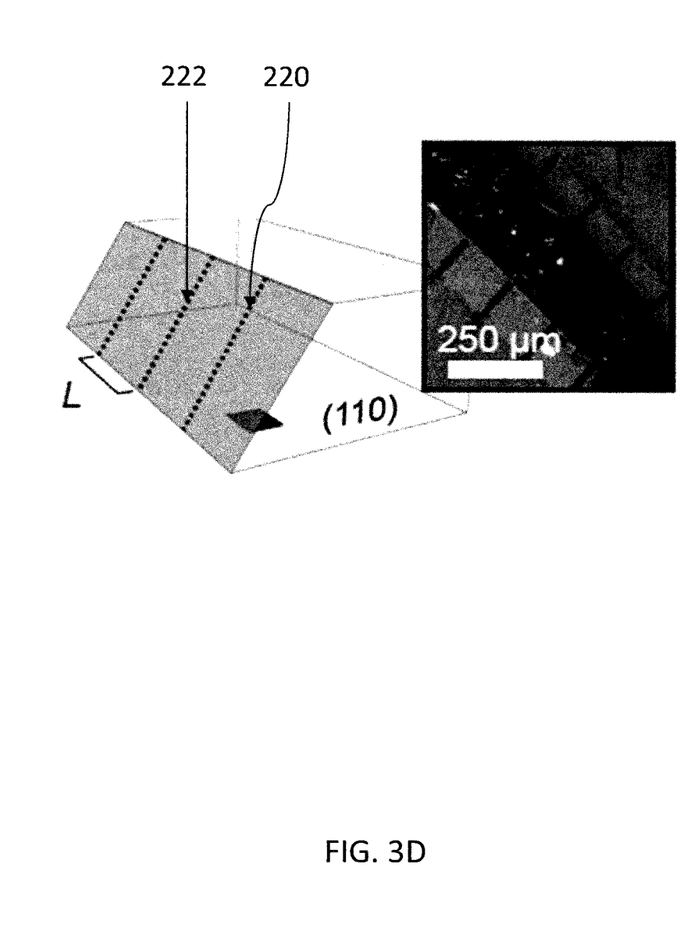
FIG. 3D is a top-down illustration of a complete cleave for a single face in accordance with aspects of the invention.
Figure 3E:
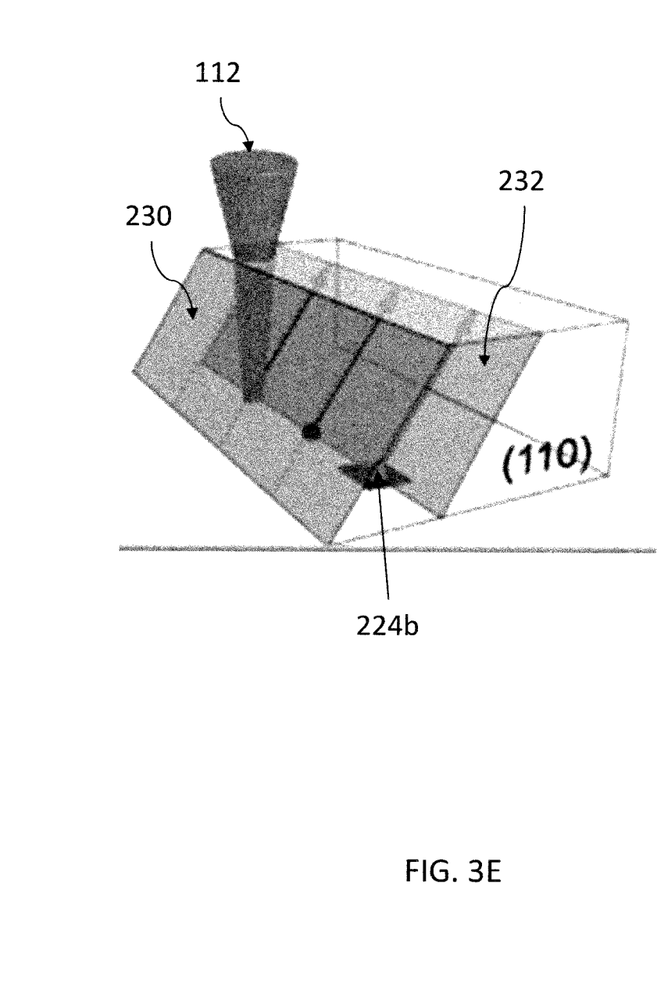
FIGS. 3E and 3F are top-down illustrations of the process depicted in FIGS. 2B-2D repeated for adjacent nucleation sites in order to cleave a single sliver with parallel {111} faces in accordance with aspects of the invention.
Figure 3F:
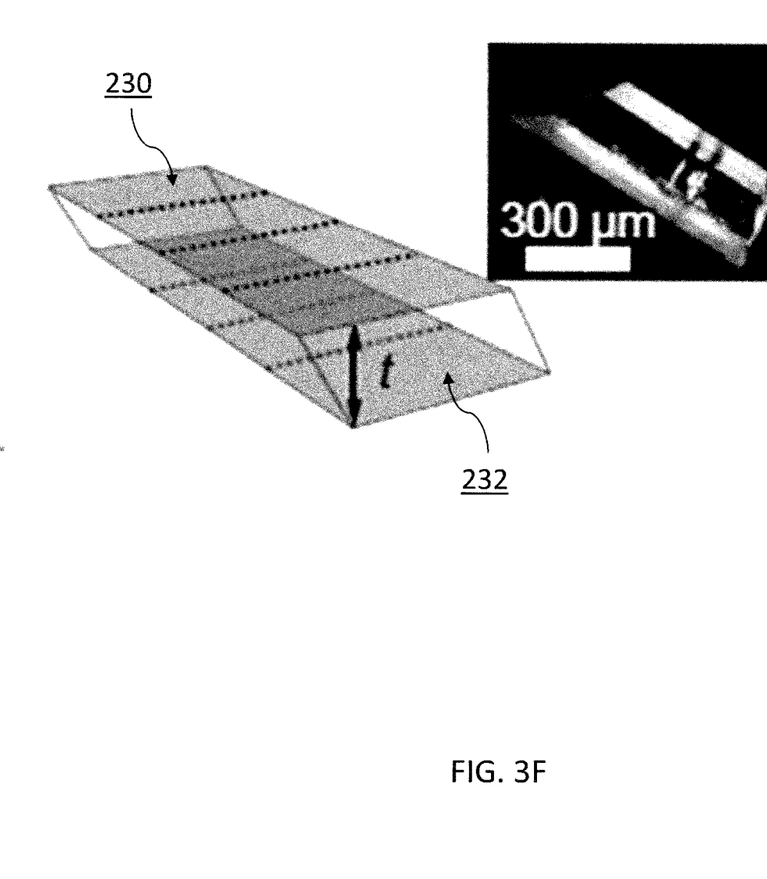

Once a single cleaved surface face 230 has been generated (FIG. 3D), the process is repeated beginning from the second nucleation site 224b placed adjacent to the first nucleation site 224a. The end result is two cleaved faces 230 and 232 of the same {111} crystallographic plane separated by a perpendicular distance d (FIG. 3F).

Mounting surfaces were found to have a significant impact on the reliability and controllability of the cleaving process, and that an insulating glass surface is optimal. Additionally, the surface quality obtained was a two order-of-magnitude improvement in $R_q$ when compared to current standard polishing methods for producing large single-plane diamond areas. For most applications, a flat-lying plate with two parallel {111} faces is desirable for convenience when mounting or fabricating on, as opposed to an exposed {111} face at a 55° angle from the flush {100} mounting surface. The techniques described herein can be extended by producing two parallel cleave surfaces 230 and 232 shown in FIG. 3F within the limiting dimensions of thickness and spatial separation between nucleation sites 224. The clear {111} face surface 230 and/or 232 area not ablated while performing laser cleave lines 220 and/or 222 is consistently 610 µm×300 µm in between each cleave line 220 and/or 222 in HP samples, and 350 µm×300 µm for LP samples. The unmarred area between cleave lines 220 and/or 222 occasionally contained Wallner lines, the continuous undulations appearing on flat crack surfaces (e.g., cleave surface 230 and/or 232) as a result of the interaction between transverse acoustic waves in the diamond 210 substrate, running along the length of the {111} face. Faces produced in LP samples, however, contained consistently fewer Wallner lines, with millimeter-scale regions of $R_q$<0.06 mm at the noise floor of an atomic-force microscopy (AFM) probe.

Without being limited to any particular theory, the inventors suspect that the mechanism for the 532 nm laser generating controlled {111} cracks relies on the rapid creation of a large graphitic region in the bulk diamond 210 that nucleates and expands upward from the nucleation site 224 on the back of the sample. Then, diamond's tendency to crack along {111} ensures that the {111} face is most likely to be produced during a cleave. Graphitization beginning at the nucleation site 224 could be achieved via nonlinear absorptive effects producing sufficient heat (T>2000 K) to graphitize the region and expand upward as spatially-overlapping pulses heat previously created graphite volumes. The focal volumes for each consecutive pulse, which correspond to the volume of graphite produced at that particular point, used in previous explorations of diamond graphitization were on the order of tens to hundreds of cubic microns. The focusing optics used by the inventors, however, produce a focal volume orders of magnitude larger (70 882 µm³), while maintaining high enough energy densities (up to 70 J/cm²) to heat and subsequently graphitize a much larger volume of diamond. This larger volume of graphitic bulk $sp^2$-bonded diamond is 40% larger per gram of carbon than surrounding crystalline $sp^3$-bonded diamond and could be providing the internally-expansive impulse needed to cleave the {111} plane. The inventors consider the two orders of magnitude difference in focal volume to be the reason {111} cracks were not observed in previous explorations of bulk diamond graphitization.

Figure 4:
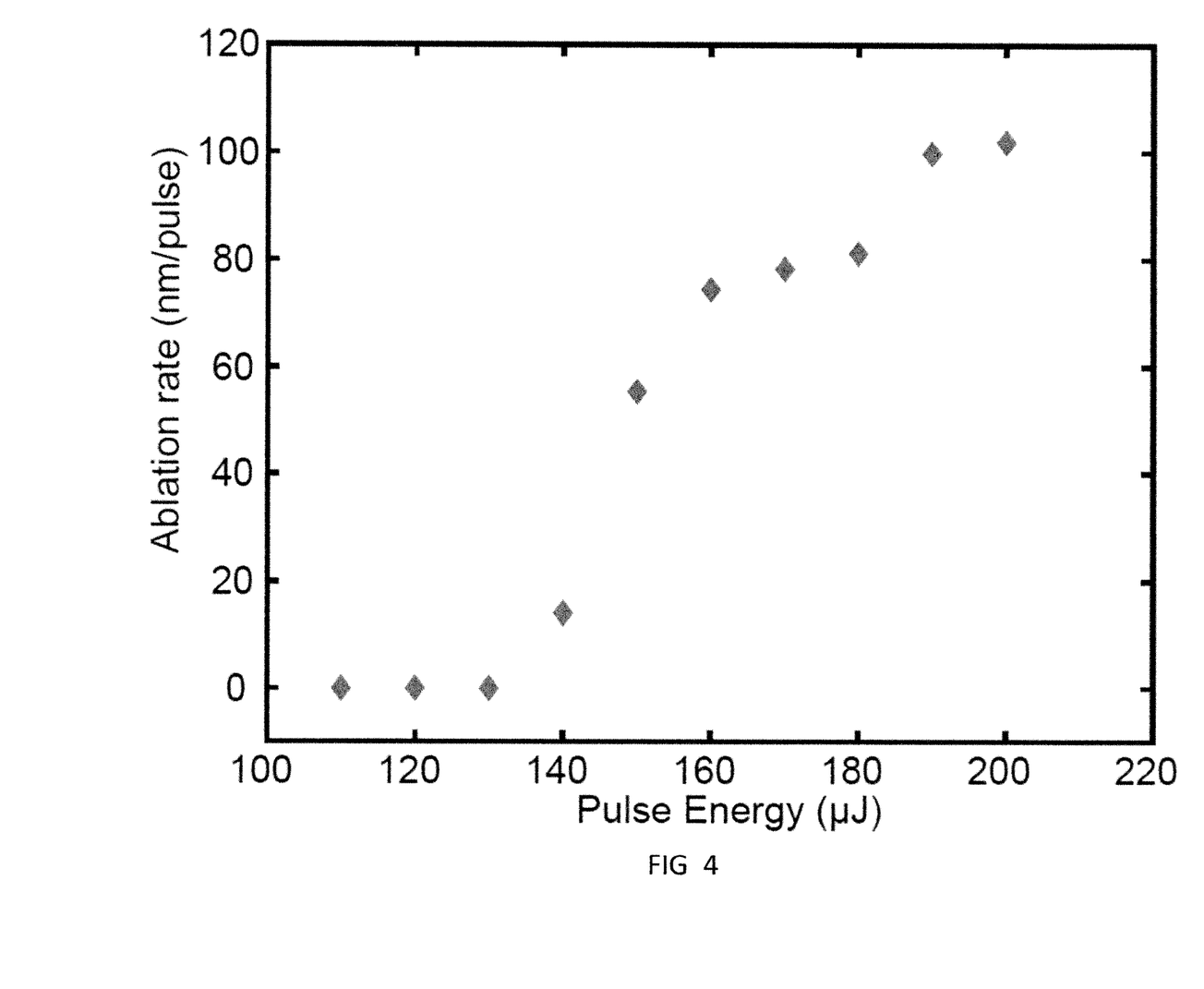
FIG. 4. a graph of experimentally determined ablation rate as a function of pulse energy for a polished diamond surface in accordance with aspects of the present invention.

Again, without being limited to any particular theory, the inventors believe they are able to selectively graphitize the backside/back surface 212 of the sample diamond 210 beginning at the nucleation site 224 because of the lower graphitization threshold of a roughened region as compared to the polished top surface (see, e.g., FIG. 4). In an example, the beam is positioned with a focus closer to the back side of the surface than the front, such that the energy density (fluence) is larger at the back surface where the nucleation site exists. The laser beam 112 is transmitted with no ablation occurring on the polished {100} front-side/front surface 216 until the more tightly focused laser beam 112 reaches the nucleation site 224—at which point, the laser beam 112 has exceeded the energy threshold required to sufficiently heat the nucleation site 224 to cause graphitization. Once the initial graphite volume has been initialized at the nucleation site 224, bulk graphite growth requires as little as 1 J/cm² to propagate. Techniques described herein may apply a fluence of 62.4 J/cm² at the nucleation site of HP samples and 55.7 J/cm² at the nucleation site of LP samples, well into the fluence regime that graphitizes diamond surfaces and grow graphitic volumes.

Unwanted cracks may appear as the original sample diamond 210 approaches dimensions comparable to the dimension of a single fabricated {111} plate 212. {111} plates 212 produced originated from relatively large CVD plates ranging from 2.0 mm×2.0 mm (HP) to 3.0 mm×3.0 mm (LP). Typically, 15-20 deterministically cleaved slivers could be produced from a single bulk sample. When this cleaving process was employed on LP diamond with a single side left unpolished (lapped, $R_q$=250 nm), it was possible to precede the cleave lines 230 and 232 with a laser-etched scribe line 236 as opposed to a nucleation site 224 that allowed for larger unmarred cleaves to propagate the length of the entire sample diamond 210 with as few as 5 cleave lines, which may be particularly useful when larger bulk areas of {111} cleave surface 230 and/or 232 are needed and when fewer restrictions on impurities apply, such as in diamond magnetometer applications.

One advantage to texturing the sample diamond 210 backside/back surface 212 in order to nucleate the first cleave/initial cleave 220 is the opportunity for patterning textured areas/regions 240 to maximize the usable area of a sample diamond 210 to produce {111} sliver plates 212. As long as the limiting dimensions are accounted for, a bulk diamond crystal can be patterned with predetermined textured regions 240 in a single processing step with a UV Excimer laser or lithographic ion etch, followed by cleaning, and finally a single cleaving step performed with the 532 nm laser.

Further improvements to this laser-stimulated crack generation in diamond 210 may come about as a result of analyzing relative velocities of the propagating cleave wave front and impulse velocity as a function of laser power and stage translation speed. By tuning the laser power, focal volume translation speed, and focal depth, the rate can be controlled at which the expanding volume of graphite grows. By changing the translation speed of the stage, we limit the time the focal volume is allowed to illuminate and grow a particular graphitic region as well as the velocity of the crack propagating from the back {100} to top {100} face. Reducing the frequency of Wallner lines may come as a result of tuning this crack velocity, as Wallner lines have been used to determine the relationship between the relative velocities of a propagating cleave and the SAW responsible for generating a cleave in glass and silicon. As the ratio of these two velocities approaches 1, the likelihood of producing Wallner lines decreases substantially. With these changes even larger pristine {111} faces/cleave surface 230 and/or 232 may be achieved to satisfy the needs of an array of diamond-related applications in a single laser-cleaving step. Improvement in the form of control of these relative velocities may also decrease the likelihood of the unwanted cracking that currently bounds the limiting dimensions of relative cleave placement and nucleation site 224 fabrication mentioned above. Thus, even thinner {111} plates could be fabricated and utilized in devices such as integrated Fabry-Pérot cavities for implementing quantum cavity electrodynamics in diamond, high-power electronics, optical components, low birefringence diamond photonic platforms, and solid-state quantum optics.

In an example, a nanosecond pulsed 532 nm fiber laser is used to controllably generate and propagate cleaves along the {111} crystallographic plane in HP and LP single-crystal CVD diamond. Regions spanning 100-200 μm×200-300 μm are reliably achievable in HP diamond, and 250-400 μm×300-1000 μm in LP diamond with surface roughness at the noise floor of the probe (Rq=0.02 nm). Parallel {111} faced plates 212 with thicknesses as thin as 286 μm in HP diamond and 172 μm in LP diamond were fabricated. This approach to diamond cleaving allows for higher precision, lower overall material stress, improved surface area and face quality, and greater sample production efficiency. With the ability to produce large {111} faces/cleave surface 230 and/or 232 out of standard CVD diamond plates comes the opportunity for further exploration of and access to diamond as an integral component in high-power electronics, quantum information architectures, and ultrasensitive magnetometers by reducing the cost and time.

EXAMPLES

In order that the invention may be more fully understood, the following non-limiting examples are provided by way of illustration only.

Example 1

In this example, a laser-nucleated cleaving (hereafter "LNC") process for a single-crystal diamond (hereafter "SCD") was employed to produce a {111} cleave surface. The LNC process employed a pulsed, focused laser with sub-bandgap photon energy (532 nm) to locally graphitize a thin (≈30 μm diameter) line that propagated a mechanical cleave along a desired {111} plane.

The LNC process was performed on commercially available CVD single-crystal diamond satisfying standard grade—standard grade diamonds having <1 ppm nitrogen and boron—and high-purity electronics grade—electronic grade diamonds having <5 ppb nitrogen and boron. Additional details regarding the SCD are provided below in Table 3.

TABLE 3

|  | Electronics grade | Standard grade |
| --- | --- | --- |
| N content | <5 pph | <1 ppm |
| B content | <1 pph | <0.05 ppm |
| Lateral Dims. | 2.0 mm × 2.0 mm | 3.0 mm × 3.0 mm |
| Thickness | 0.5 mm | 0.3 mm |
| Part no. | 145-500-0385 | 145-500-0253 |

Figure 5A:
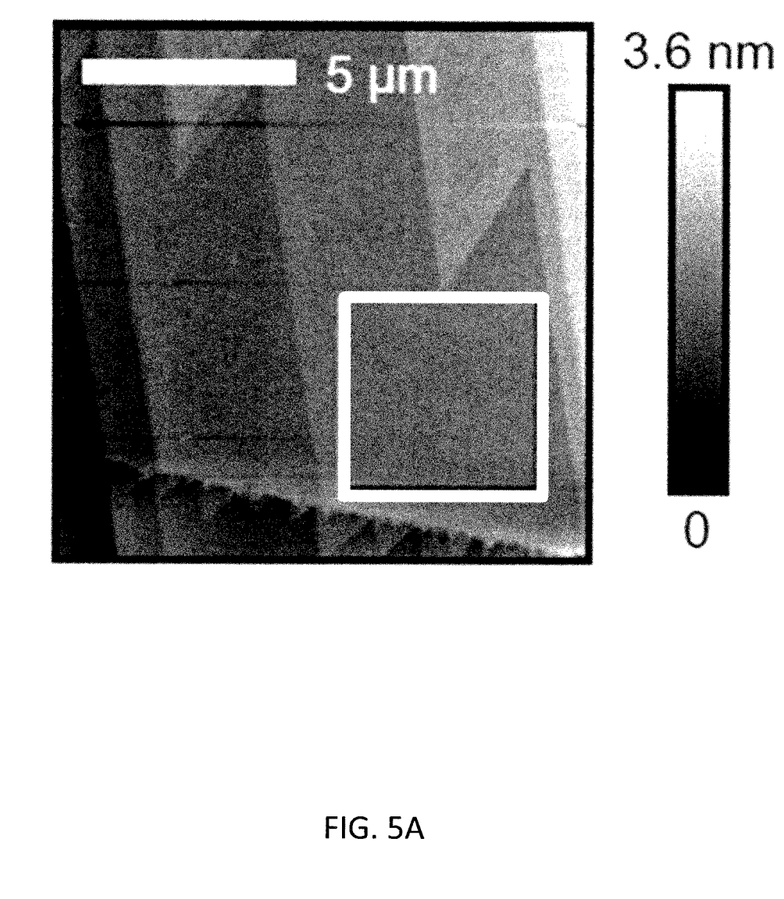
FIG. 5A is an atomic-force microscope image illustrating surface topography including atom-scale terraces occurring on a {111} surface during laser cleaving methods according to aspects of the invention employed in Example 1.

A parallelepiped shape was formed by generating two parallel {111} cleaved surfaces for each SCD using the LNC process (e.g., see FIGS. 3A-3F). The two parallel {111} cleaved surfaces were atomically-flat as confirmed by the terraced surface topography in FIG. 5A, with steps of height 0.206 nm, consistent with the expected spacing of atomic planes in {111} directions. Additionally, the LNC process eliminated kerf loss and did not require mechanical polishing of the {111} cleaved surfaces.

The LNC process started with the creation of a nucleation site on the bottom surface of the starting SCD plate. The nucleation site acted as a seed for producing the initial cleave. For samples with two polished {100} faces, textured regions can be laser-machined onto the backside using an excimer laser with a wavelength of 193 nm, pulse energy of 800 μJ, 10 ns pulse duration, and a minimum spot size of 10 μm achieved by a square aperture. For single-side polished plates, the unpolished side of as-received samples with a surface roughness of Rq=250 nm was found to be sufficient to nucleate cleaves without any additional patterning.

A nanosecond pulsed, frequency-doubled Yb-doped fiber laser generator was operated at a wavelength of 532 nm with a repetition rate of 150 kHz and a pulse length of 2 ns. The laser generator was integrated in a micro-machining laser system (IPG Photonics, IX-280-ML). The primary focusing optic was a 100 mm-focal-length objective that produces a beam waist of diameter <17 μm, a beam quality factor of M2=1.5, and a depth of field ≈800 μm. The laser focus and course lateral position were controlled using a motorized stage, and cuts were made by steering the beam with a galvo scanner. The starting SCD plate was fixed to a 1.0 mm thick glass microscope slide with double-sided tape so that the micromachining laser can be focused through the air/diamond interface (e.g., the top surface) onto the tape-diamond interface (e.g., the bottom surface). The orientation of the SCD plate relative to the micromachining laser system was adjusted using the sample stage and confirmed using the co-aligned microscope and camera. Typically, the sample tilt is minimal when mounted using tape, and the rotation about the optical axis was adjusted such that the sample sides are aligned horizontally and vertically within ±1°.

The beam focus was positioned such that the bottom surface of the SCD plate ablated while the top surface did not ablate. The laser focus was determined by the stage height producing the minimum ablated region width. In the coordinate system of this example, increasing stage heights implies that the sample is being translated closer to the focusing lens. SCD ablation by sub-bandgap light is a nonlinear optical process, and the ablation rate depends sensitively on the pulse fluence. Positioning the laser focus close to the bottom surface establishes a fluence gradient such that the top surface is unaffected by the micromachining laser beam, whereas the bottom surface is above the threshold for ablation and graphitization. The presence of a roughened diamond surface, e.g., a fabricated nucleation site or an unpolished bottom surface, further lowers the threshold for ablation. For example, FIG. 4 depicts the experimentally measured ablation rate of a top polished SCD surface as a function of pulse energy for our micromachining laser, exhibiting an abrupt threshold around 140 μJ.

The ablation rate was measured as a function of pulse energy by setting the top diamond surface at the point of laser focus, fixing the laser rep rate at 150 kHz, and linearly varying the laser pulse energy between 10 μJ and 200 μJ in 10 steps with a variable attenuator to produce the series of ablation sites. Five exposures at each pulse energy were performed and averaged to arrive at the measured depth of the resulting ablation site, which were measured by AFM.

To initiate a cleave, the micromachining laser beam was aligned over a textured nucleation site, or a target region of an unpolished bottom surface using the sample stage. The laser beam was then switched on and laterally scanned in x-direction at a speed of 8 cm/s by a distance w, as illustrated in FIG. 3B. The scan distance was calculated according to w=h/tan 55°, where h is the starting SCD plate thickness, and 55° is the angle between the {111} and {100} lattice vectors. For example, the scan distances for typical commercially available plate thicknesses of 300 μm and 500 μm were 210 μm and 350 μm, respectively. This translation distance ensures that the cleave extends through the full thickness of the SCD (x-z plane). After this step, a darkened line appeared and a new reflective surface could be seen within the diamond (as illustrated, e.g., in FIG. 2B). The combination of these two observations heralds the presence of a cleave along a {111} cleave surface.

A typical cleave propagates a few hundred microns away from the laser scan line in the y-direction. The {111} cleave surface/crystal face was extended by repeating the lateral laser scans used in the previous step, but with the beam translated along the y-direction near the edge of the newly-created {111} cleave surface. By scanning the laser again along the x-direction extended the cleave further along the y-direction, as shown in FIGS. 3C and 3D. As such, a textured nucleation site is preferred at the position of the first laser scan line to initiate a cleavage plane. After each subsequent extension of the {111} cleave surface, a new boundary was identified in the microscope and the laser scan process was repeated until the cleave was extended across the entire width of the starting SCD plate, creating a fully exposed {111} surface (e.g., see FIG. 3D).

To complete the parallelepiped shape for the SCD plate having two parallel {111} cleave surfaces, a second {111} crystal face was generated parallel to the initial exposed {111} cleave surface. The distance between the two nucleation sites set the resulting plate thickness t, e.g., as seen in FIG. 3F. For reliable performance, the second nucleation site should be offset by a distance greater than the beam translation distances as described above (d>w) (e.g., as seen in FIG. 2E), hence the minimum thickness of the SCD plate having {111} cleave surfaces is limited by the starting plate height, and is given by tmin=h cos(55). For example, for typical commercially available {100} plates with heights of 300 μm and 500 μm, the minimum thicknesses are 172 μm and 290 μm, respectively.

The SCD plates having {111} cleave surfaces were mounted on a glass slide using crystal bond and measured at room temperature using X-ray diffraction with a λ=0.1544 nm source, a 1° divergence slit, 1° scatter slit, 0.6 mm receiving slit, and a scintillator detector. Surface roughness was characterized using an Asylum MFP-3D atomic-force scanning probe with z-axis noise <0.06 nm (average deviation) in a 0.1 Hz-1 kHz bandwidth.

The SCD plates having {111} cleave surfaces produced by the LNC had dark lines on the top and bottom surfaces of the SCD plates at the locations of the micromachining laser scan lines. A laser-scan-line separation in y of L=300 μm was found to be suitable for reliably propagating the cleave using an automated process. However, by manually identifying the cleavage plane boundary in the microscope, much larger spacing can be realized, resulting in laser-scan-line-free areas ranging from 0.18 mm$^2$ to 1.2 mm$^2$.

Using the process in this Example, a single 3 mm×3 mm (100) SCD plate can typically yield up to 10 {111} cleave surface faced plates. The number was limited due to the increasing number of stochastically-generated cracks along undesired planes as the original SCD plate is diced into multiple {111} cleave surface faced plates. Plate thicknesses of 170 μm and 290 μm were reliably produced. Stochastically-generated cracks can produce plate thicknesses down to 50 μm. Thicker plates can be produced by increasing the distance w between nucleation sites.

Figure 5B:
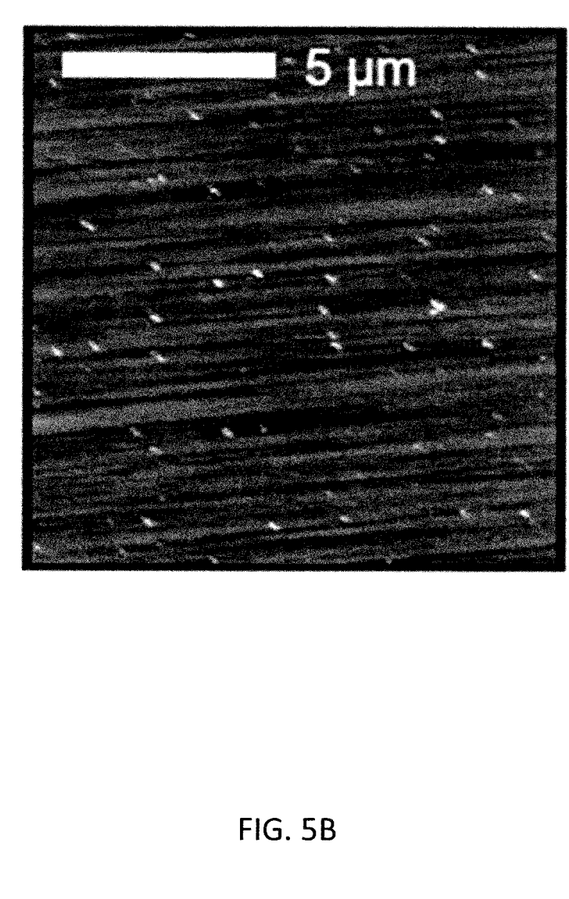
FIG. 5B is an atomic-force microscope image illustrating the surface topography of the {100} surface of an EG-SCD plate, as-received from the manufacturer following cleaning using an acid bath and $O_2$ plasma treatment.

Lines running along the {111} cleave surface face in the direction of the cleave propagation was observed in the differential-interference-contrast optical microscope. These nanometer-scale steps or ridges are known as Wallner lines, which appear ubiquitously on cleaved surfaces of brittle materials as a result of the interaction between the crack front and transverse acoustic waves. Using atomic force microscopy (hereafter "AFM"), the Wallner lines exhibited step heights of 10-50 nm, with separations that vary from ≈10 μm near the initial laser scan line to >100 μm in regions farther away. The areas between Wallner lines exhibit atomically-flat {111} cleave surfaces characterized by micron-scale, triangular terraces with step heights consistent with the expected 0.206 nm spacing of {111} atomic planes. The terraces are occasionally intersected by linear features as observed in the bottom-left of FIG. 5A. For comparison, the polished (100) surface of an EG-SCD plate, as-received from the manufacturer following cleaning using an acid bath and O2 plasma treatment, is displayed in FIG. 5B. In between Wallner lines, we typically observed atomic terraces with ≈2 μm spacings, corresponding to a miscut angle of ≈0006°. Over larger length scales, Wallner lines of height ≈50 nm are typically separated by ≈10 μm, corresponding to an overall miscut angle ≈0.3°.

The root-mean-square (hereafter "RMS") surface roughness values of Rq=0.22 nm and 0.46 nm for the {111} cleaved surface and polished {100} surfaces, respectively. The LNC surface roughness represents an order-of-magnitude improvement compared to typical manufacturer specification for the polished surface (average roughness <5 nm) and a smoothness comparable to the best values reported from advanced polishing techniques of <0.1 nm. The majority of the {111} cleaved-surface roughness occurred in the form of atomic steps with micron-scale spacings, whereas the polished surface exhibits roughness over a broad range of spatial frequencies. The calculated RMS roughness of the 25 μm² region on an atomic terrace is Rq=0.05 nm, corresponding to the noise floor of the AFM tool.

Using the LNC process of this example, graphitization waves were propagated by focusing the laser through the starting SCD plate such that the beam fluence was sufficiently large at the bottom surface nucleation site to initiate graphitization, while the defocused beam fluence at the top surface was below the graphitization threshold, as illustrated in FIG. 4. The fluence threshold for graphitization by a focused beam within bulk diamond is substantially higher than for surfaces and was never reached in our experiments. However, once the graphitization wave was initiated at the nucleation site, the ablation threshold dropped abruptly such that the fluence required to propagate the wave was much lower than the bulk graphitization threshold, allowing for the wave front to be guided along a {111} plane by laterally scanning the laser in the x-direction. By using a laser fluence of 90 μJ/cm², a spot size of 17 μm, and a scan speed of 8 cm/s, a graphite wave was created with a sufficiently large transverse diameter to fracture the SCD as it propagates in a {111} surface plane.

Example 2

A LNC process similar to that described in Example 1 was performed on unpolished-surface of single-side polished (hereafter "SSP") starting plates.

Figure 6A:
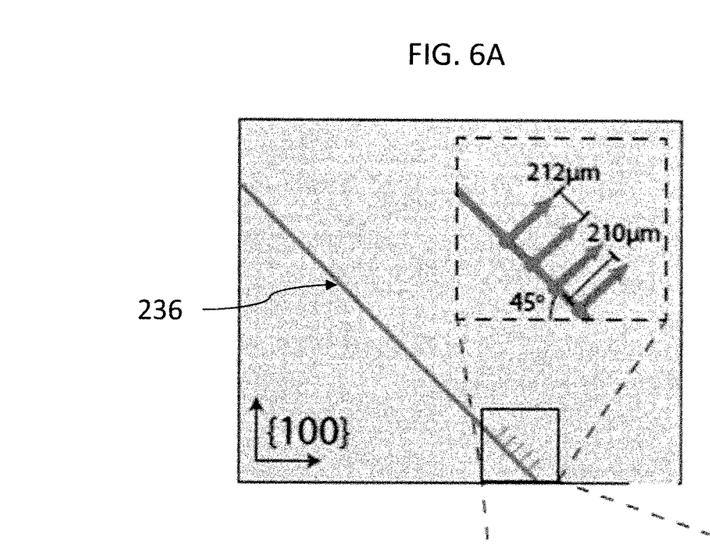
FIG. 6A is a schematic illustrating the orientation of the scribe line cut with respect to the orientation of the SG-SCD diamonds in accordance with aspects of the invention.

Using the LNC process, SG-SCD plates were produced with a {111} surface planes without the need for a nucleation site. It was discovered that a scribe line could be cut into the rough back-surface using selective ablation, which facilitates the propagation of a cleave along the length of the sample unhindered. The {111}-surface planes were unmarred by the cleave lines for >2 mm. Pursuant to this procedure the rough back surface of the diamond was oriented on the bottom with respect to the laser generator. A scribe line was created on the bottom surface, oriented along the desired crystal plane, using the selective ablation procedure with the laser repeat set at 75 kHz (half the normal operating reprate of 150 kHz). Following creation of the scribe line, the laser was rastered across 3-5 lines separated by=212 μm at 100% power (e.g., FIGS. 6A and 6C). The first raster initiate the cleave, and the subsequent lines propagate the cleave across the entire scribe line to the sample edge.

Figure 6B:
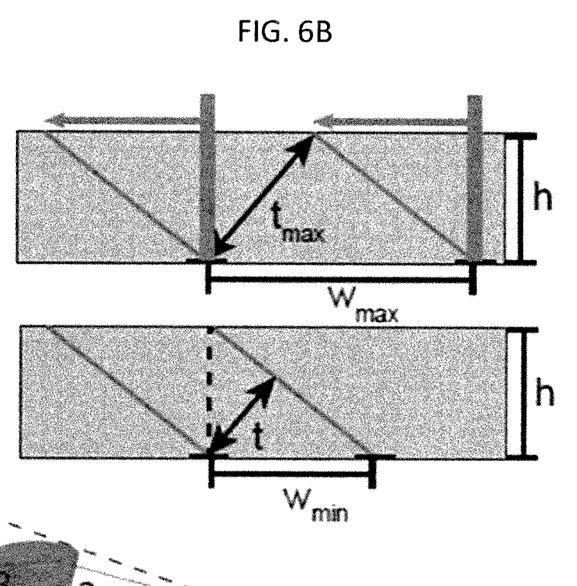
FIG. 6B is a schematic illustrating a side profile view of a SG-SCD diamond with two {111} cleave surfaces.
Figure 6C:
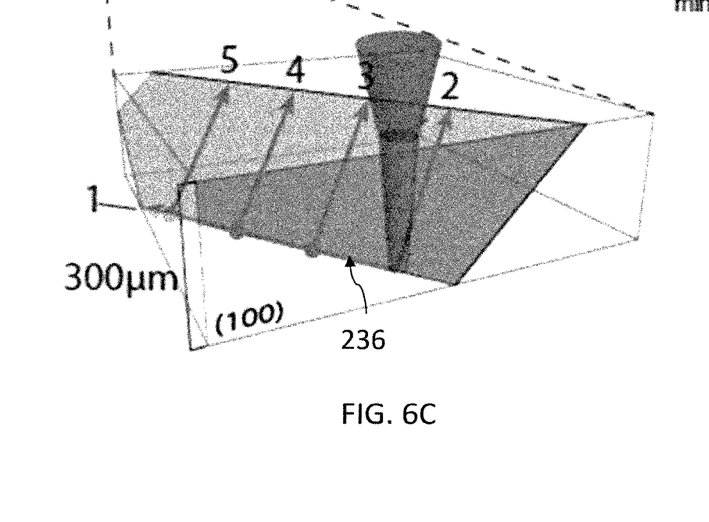
FIG. 6C a schematic illustrating an expanded view of the schematic of FIG. 6A.

The thickness of {111} cleave surface faced SCD plate was chosen by considering the distance between the two desired crystal faces, t, and then selecting the appropriate distance between nucleation sites, w (e.g., as see in FIG. 6B). The minimum thickness for the produced {111} cleave surface SCD plates corresponded to tmin=h)cos(55°), where h is the sample thick-ness. It is contemplated that by performing the cleaves on alternating sides of the diamond, thinner plates could be obtained. The maximum thickness for the produced {111} cleave surface SCD plates corresponded to tmax, as shown in FIG. 6B.

Power spectral density (hereafter "PSD") analysis of the surfaces of LNC fabricated {111} cleave surface SCD plate was used to characterize the surface roughness at distinct length scales of topographical features. Peaks in a given PSD curve correspond to distinct frequencies of roughness, and their heights are related to their contribution to the RMS roughness at that spatial frequency. Discrete inverse and forward discrete Fourier transforms were determined for describing the surface topography, hx, using the below equations:

$$h_x = \frac{1}{L_x}\sum_q \tilde{h}_q e^{iqx}$$

$$\tilde{h}_q = l_x \sum_x h_x e^{-iqx},$$

where Lx is the length of the AFM scan in the x-direction, q is the vector of spatial frequencies, and lx is the pixel size of the AFM scan, lx=Nx/Lx where Nx is the number of points across a single horizontal line scan. The PSD of the topography above is then defined as:

$$C_q^{1D} = L_x^{-1}|\tilde{h}_q|^2$$

It follows that the above equation relates to the RMS roughness (Rq) by:

$$R_q = \sqrt{L_x^{-1}\sum_q C_q^{1D}}$$

To calculate the PSD, for a given AFM scan, the fast Fourier transform (hereafter "FFT") algorithm was used to calculate the Fourier components hq and corresponding PSD for each line scan of the image, and then averaged together to calculate the PSD for the full image. No image adjustments or corrections were applied to the AFM data prior to this analysis. It is noted that, as calculated, the PSD only reflected spatial frequencies in the (horizontal) x-direction of each AFM image, so the specific shape of the curve can depend on the orientation of the image relative to specific sample features. However, the integrated value of the RMS roughness is independent of sample orientation.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for forming a cleaved surface of a diamond, the method comprising:
forming an initial cleave line in the diamond, which is located in an x-y-z coordinate system having orthogonal x, y, and z axes, by scanning, in in an x direction of the coordinate system, a laser beam extending through the diamond from a first surface of the diamond located in a first plane parallel to an x-y plane in the coordinate system to a second surface of the diamond located in a second plane parallel to the first plane and spaced in a z direction of the coordinate system from the first plane; and
forming a plurality of additional cleave lines in the diamond by incrementally repositioning the laser beam in a y direction in the coordinate system along a cleaving surface and scanning, in the x direction, the laser beam at each incremental position, wherein scanning the laser beam in the x direction includes translating the laser beam in the x direction while the laser beam is active and extending in the z direction from the first surface to the second surface of the diamond;
wherein the initial cleave line and the plurality of additional cleave lines comprise cracks extending from the first surface to the second surface that define the cleaved surface of the diamond and the initial cleave line and the plurality of additional cleave lines are angularly offset from the z direction in which the laser beam extends from the first surface to the second surface and the cleaved surface comprises a surface in a 111 crystallographic plane tilted from the z axis in the x direction and extending from the first surface to the second surface of the diamond.

2. The method of claim 1, further comprising focusing the laser beam such that a fluence differential between a first fluence level at the front surface and a second fluence level at the back surface prevents at least one of graphitization and ablation from occurring on the front surface.

3. The method of claim 1, further comprising forming a plurality of textured regions in the second surface by translating a pulsed laser beam across the second surface, wherein the plurality of textured regions form a pattern.

4. The method of claim 1, wherein the laser beam produces a graphite layer along each of the cleave lines.

5. The method of claim 1, further comprising forming a scribe line with the laser beam along the second surface of the diamond.

6. The method of claim 5, wherein the scribe line joins origins of at least two cleave lines.

7. The method of claim 1, further comprising fabricating at least one textured region on the second surface of the diamond, wherein fabricating the at least one textured region includes translating a pulsed laser beam across the second surface.

8. The method of claim 7, wherein the at least one textured region includes a single textured region for each cleaved surface of the diamond.

9. The method of claim 8, wherein the initial cleave line originates from the textured region.

10. The method of claim 7, wherein the textured region is a roughened portion on the second surface of the diamond.

11. The method of claim 1, further comprising fabricating a plurality of textured regions on the second surface of the diamond by translating a pulsed laser beam system across the second surface, each textured region corresponding to a nucleation site.

12. A laser system for nucleated cleaving of a diamond, the system comprising:
a laser beam generator configured to produce a laser beam for nucleated cleaving; and
a processor configured to control the laser beam generator to:
form an initial cleave line in the diamond, which is located in an x-y-z coordinate system having orthogonal x, y, and z axes, by scanning the diamond in in an x direction of the coordinate system with the laser beam, the laser beam extending through the diamond from a first surface of the diamond located in a first plane parallel to an x-y plane in the coordinate system to a second surface of the diamond located in a second plane parallel to the first plane and spaced in a z direction of the coordinate system from the first plane,
form a plurality of additional cleave lines in the diamond by incrementally repositioning the laser beam in a y direction in the coordinate system along a desired cleaving surface and scanning the diamond in the x direction with the laser beam at each incremental position, and wherein the initial cleave line and the plurality of additional cleave lines comprise cracks extending from the first surface to the second surface that define the cleaved surface of the diamond and the initial cleave line and the plurality of additional cleave lines are angularly offset from the z direction in which the laser beam extends from the first surface to the second surface,
wherein scanning the laser beam in the x direction includes translating the laser beam in the x direction while the laser beam is active and extending in the z direction from the first surface to the second surface of the diamond and the cleaved surface comprises a surface in a 111 crystallographic plane tilted from the z axis in the x direction and extending from the first surface to the second surface of the diamond.

13. The system of claim 12, wherein the laser beam generator is selected from the group consisting of pulsed lasers, frequency-doubled lasers, visible wavelength lases, and solid-state lasers.

14. The system of claim 12, wherein a graphite layer is formed along the initial cleave lines and the plurality of additional cleave lines.

15. The system of claim 12, wherein the processor is configured to control the laser beam generator to generate a textured region in the second surface by translating a pulsed laser beam across the second surface and wherein the initial cleave line originates at the textured region.

* * * * *